June 18, 1968 W. H. COULTER ET AL 3,389,334
PARTICLE ANALYZING APPARATUS HAVING MEANS FOR
OBSERVING A SCANNING APERTURE
Filed July 14, 1964
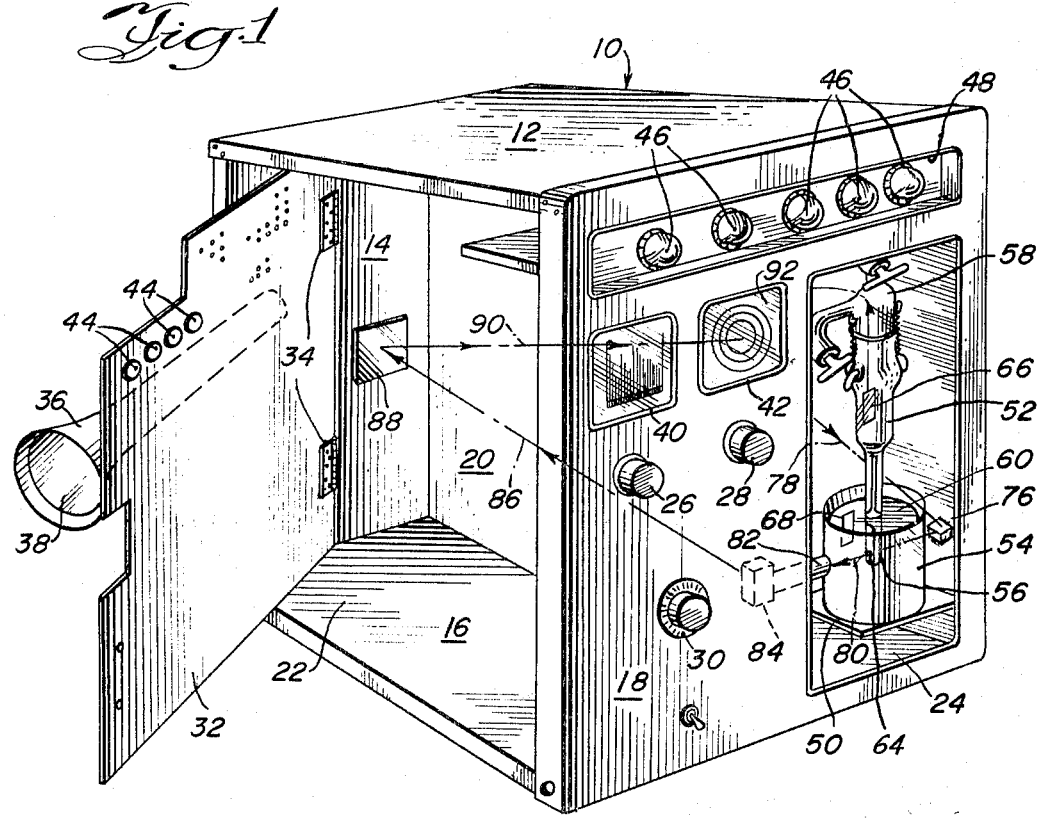
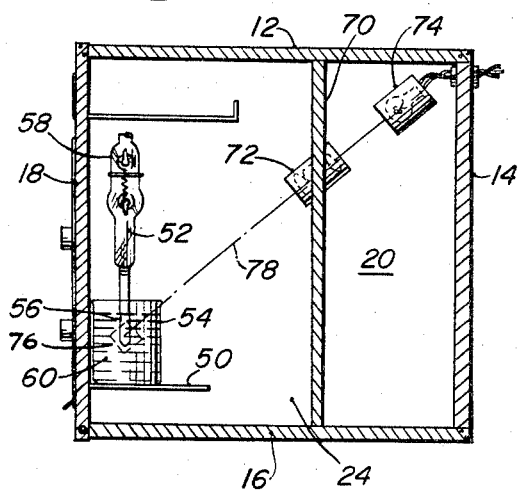
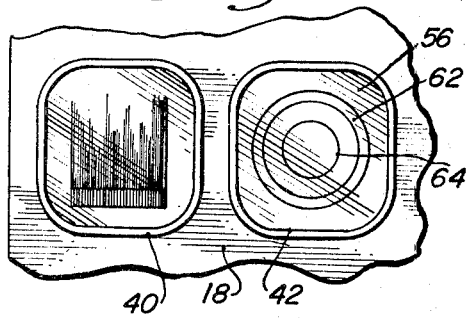
INVENTORS.
Wallace H. Coulter
Walter R. Hogg
By Silverman & Cass
ATTORNEYS.

United States Patent Office 3,389,334
Patented June 18, 1968

3,389,334
PARTICLE ANALYZING APPARATUS HAVING MEANS FOR OBSERVING A SCANNING APERTURE
Wallace H. Coulter and Walter R. Hogg, Miami Springs, Fla., assignors to Coulter Electronics, Inc., Hialeah, Fla., a corporation of Illinois
Filed July 14, 1964, Ser. No. 382,560
8 Claims. (Cl. 324—71)

ABSTRACT OF THE DISCLOSURE

An apparatus for analyzing microscopic particles suspended in a solution and forced through a microscopic scanning aperture which is subject to blockage by oversized particles and debris. The apparatus includes a cabinet which is fitted with optical elements that are focused on the aperture and cast an enlarged image of the aperture upon a screen mounted on the control panel of the cabinet. The apparatus also includes an oscilloscope which is responsive to particles passing through the scanning aperture. The viewing screen of the oscilloscope is mounted adjacent the aperture image screen to enable the simultaneous visual monitoring of the distinctive, yet operationally related, physical and electrical functions of the scanning aperture.

This invention relates generally to particle counting and sizing apparatus, and particularly, is concerned with novel apparatus of the Coulter electronic particle analyzing type in which there are provided optical means for continuously surveying the minute scanning aperture.

The Coulter principle of counting and sizing particles requires the passing of a sample suspension of the particles to be studied through a fine aperture at the same time that an electric current is passed through the liquid in the aperture, and detecting the changes in the impedance of the electric path in that portion of the suspension liquid effectively included in the aperture. Apparatus embodying the Coulter principle is described in U.S. Patent No. 2,656,508. One structure for metering the suspension as it passes through the aperture is disclosed in U.S. Patent No. 2,869,078. Another fluid metering system and apparatus is described in U.S. Patent No. 3,015,778. The type of scanner element suitable for use in this apparatus is described in U.S. Patent No. 2,985,830.

For the purposes of this specification, there is no need to describe the Coulter apparatus involved at great length since it is well known throughout the world. The Coulter apparatus is used for studying the physical properties of a large variety of minute particles, such as, blood cells and other minute biological particles, and all types of industrial particles, such as catalysts, fibers, foods, inks, fats, among others. There is no restriction to the type of partcle which can be counted and sized so long at it can be prepared as a suspension with an electrolyte and so long as it is capable of passing through an aperture of microscopic proportions. Such apertures can range from several microns to several hundred microns in diameter.

In prior structures using the Coulter principle, one of the most annoying and most disturbing of occurrences is the blocking of the aperture either wholly or partially by a particle or particles, or piece of debris. Aperture blockage destroys the accuracy of the apparatus; therefore, when such a blockage occurs, it is necessary for the operator to clear it. The applicants herein have devised electronic means for alerting the operator when a blockage occurs, but these means are expensive and complex.

In order to achieve reliable results, it is customary to maintain substantially continuous optical surveillance of the aperture of the Coulter apparatus. The greater portion of Coulter particle counting and sizing devices sold comprise means attached directly to the apparatus for viewing the minute scanning aperture which could otherwise be invisible to the unaided eye. For example, a suitable source of light is directed at the aperture from the side opposite the location of the microscope so that the user may, from time to time, look into the microscope and observe whether or not the aperture is blocked. In the commercial apparatus, there also is an oscilloscope which may be viewed by the operator to ascertain generally the range of particles being studied. In some instances, the operator may ascertain from the presence of an abnormal oscilloscope trace that a blockage of the aperture may have occurred. Having observed an abnormal trace, the operator must next examine the aperture through the microscope to confirm the occurrence of a blockage. This requires two separate observations at two different points for obviously it is impossible to watch the oscilloscope and look into a microscope at the same time. The microscope further limits the usefulness of the Coulter apparatus because it is an expensive appendage or protrusion from the apparatus making the storage set up and use of the Coulter apparatus difficult.

The principal object of the invention is to provide structure which enables a continuous view of the aperture of said Coulter apparatus without the need for a microscope; and to provide the same in a location which enables the technician to see the oscilloscope and said aperture simultaneously.

A further object of the invention is to provide a novel projection system for enabling said aperture to be viewed, irrespective of whether or not there is an oscilloscope and without the need for a microscope.

A further object of the invention is to provide a novel counting and sizing apparatus in which the entire apparatus providing all of such advantages and functions is made available in a single cabinet by reason of the unusual combination and arrangement and construction of parts thereof.

Many other objects and advantages will occur to those skilled in the art as a description of the invention proceeds, in connection with which there is described a preferred embodiment in conjunction with the accompanying drawing in which:

FIG. 1 is a perspective view of the apparatus embodying the invention, same being shown without a substantial portion of the electrical circuitry and in a simplified version sufficient to characterize the material portions thereof for the purposes herein desired.

FIG. 2 is a sectional view taken through the so-called stand compartment of the apparatus.

FIG. 3 is a fragmentary front elevational view of the two windows through which are displayed the trace of a cathode ray oscilloscope and the projection of the aperture in such apparatus.

In accordance with the invention, the aperture of the Coulter aperture tube is in a beam of light and the image which is derived is magnified and directed to be projected on a screen. The screen may be disposed in a window on the front wall of the cabinet housing the Coulter apparatus. In the preferred embodiment, the window containing the screen is located adjacent to a second window containing the face of a cathode ray oscilloscope tube. The operator thereby has both displays immediately in view in front of him during use of the apparatus and can ascertain promptly and effectively whether or not any change in the trace of the cathode ray oscilloscope is caused by a blockage of the scanning aperture. Likewise, he may see whether or not his action in clearing the aperture, for example, by passing fluid through it or rubbing the end of it with his finger, has been effective.

Referring now to the drawing, in FIG. 1, the reference character 10 designates generally a cabinet housing the recognized Coulter electric counting and sizing apparatus. Said cabinet has a top wall 12, rear wall 14, bottom wall 16, side walls (not shown), a front panel 18 and generally, a dividing partition 20 arranged normal to the planes of the top wall 12 and front panel 18.

The partition 20 divides the apparatus 10 into what may be called the electronics compartment 22 seen on the left side in FIG. 1 and the stand compartment seen on the right side, the latter being designated 24 in FIG. 1. Various control knobs are mounted on the front panel 18 and connect with the electronic components of the apparatus, such knobs being shown, for example, at 26, 28 and 30. These may control, for example tthe cathode ray oscilloscope circuits, the projection light intensity and the threshold voltage of the cathode ray oscilloscope, respectively. A cathode ray oscilloscope 36 is mounted on a door 32 which is secured to the rear wall by hinges 34 so that when the door swings into closing position parallel with the partition 20, the face 38 of the cathode ray oscilloscope will appear in the window 40 provided in the front panel 18. A second window 42 also is provided in the panel 18 alongside of the window 40. The controls for the trace of the cathode ray oscilloscope may be mounted inside the cabinet at 44 since they normally will not be adjusted by the user.

The number of particles which have been counted is displayed visually on counter tubes 46, these tubes being shown protruding from the upper portion of the panel 18 and arranged in a window 48.

On the right hand side of the cabinet of apparatus 10 seen in FIG. 1, there is provided a stand chamber 24. In general, the stand within the chamber includes means for breaker 50, an aperture tube 52, a manometer 58, electrodes 66 and 68, supporting an aperture tube 52, a beaker 54, a manometer 58, electrodes 66 and 68, and various stop-cocks, valves, and hardware; however, for purpose of disclosing this invention, it is sufficient to show only those portions which cooperate with the novel optical system. The Coulter aperture tube 52 is suspended to be immersed in the beaker 54, which normally is carried on a platform 50 with the lower end 56 of the aperture tube suitably aligned with a beam of light presently to be described. A portion of the metering manometer device is shown at 58. It will be appreciated that a suction force is applied to the aperture tube 52 in order to draw the suspension 60 contained within the beaker 54 through the minute scanning aperture provided in the bottom end 56 of the aperture tube, as fully explained in the patents mentioned heretofore.

A side view of the apparatus illustrating a portion of a preferred embodiment of the novel optical system is shown in FIG. 2.

In compartment 24, there is provided a vertical standard 70 to which is secured a collimator 72 or other optical concentrating means so that the light from a source 74 directed at the collimator 72 will be focused into a beam incident on a prism 76 suitably mounted at precisely the level of the scanning aperture in the lower end 56 of the aperture tube. Reference will be made herein to light beam concentrating or condenser means intended to signify a collimator or other optical lens system capable of producing the beam 78. The beam 78 passes through the prism 76 and is reflected at a right angle to its incident path 78 to provide a concentrated beam of light as shown at 80, this beam of light passing through the suspension 60 and the scanning aperture 64 to an objective lens system 82 supported transversely through wall 20. The collimated, concentrated, and reflected beam 80 is to be substantially larger than the object, the scanning aperture, and will illuminate a portion of the tube 52 which includes the aperture and its wafer 62. The system 82 may have projecting lenses and the image of the aperture 64 and its wafer 62 will be projected into an additional prism or optical bending device 84. It will be appreciated that the objective system 82 extends through the partition 20 so that the light bending device 84 is in the compartment 22. From the light bending device or prism 84 which may be a part of the objective system 82, the image is projected by way of the beam 86 to a mirror 88 mounted to the rear wall 14 at a suitable cant so that the image again is reflected by way of the beam 90 to a ground glass screen or other translucent member 92 set into the window 42. This member 92, therefore, serves as a screen and by virtue of the long path taken, the projected image may be very substantially enlarged to one or more inches and can readily be seen by the operator.

In the adjacent window 40 the operator can see a typical display of a cathode ray oscilloscope reacting to the pulses produced by particles passing through the aperture 64. The projected view of the scanning aperture and the oscilloscope trace, as seen by the operator, is shown in FIG. 3. The projected view in window 42 comprises images of the aperture 64, the wafer 62 containing the aperture and the lower end 56 of the aperture tube 52 to which the wafer is fused. Both of the displays in the windows 40 and 42 may be simultaneously observed by the operator.

Although not specifically shown, it will be appreciated that the invention may employ various means for aligning the several components of the optical lens system with the aperture 64 of the tube 52. For optimum projection, the center of the beam 80 should be carefully aligned with axis of the objective lens system 82. Since the center of the aperture 64 also should be aligned with the center of beam 80, the invention contemplates means for adjusting the position of the tube and prism 76 to attain such proper alignment of the aperture. Also, means for focusing the lens of the objective lens system 82 for optimum projection of the aperture image by beam 86 may be provided. Since the principles of the invention have been fully disclosed, alternative means for accomplishing these functions, which may comprise structures embodying a wide range of known expedients, have not been suggested it has been deemed unnecessary to illustrate other specific structure in this regard.

It is believed that as a result of the invention, a compact Coulter type counting and sizing apparatus can be made very economically. It should be obvious that various modifications may be made without departing from the spirit or scope of the invention as defined in the appended claims.

What it is desired to secure by Letters Patent of the United States is:

1. A particle analyzing apparatus for studying particles suspended in a fluid and for monitoring the passage of the particles relative to a scanning aperture comprising:
    an analyzing device having a microscope scanning aperture and means for causing the fluid to pass through the scanning aperture,
    a cabinet into which said device is mounted,
    said cabinet having a facing panel,
    an image screen mounted on said facing panel,
    means secured within said cabinet for projecting an enlarged image of said scanning aperture onto said image screen,
    whereby the movement of particles to and through said aperture can be visually monitored from positions distant from said facing panel.

2. The apparatus defined in claim 1 in which:
    said analyzing device further includes means for generating electric signals in response to the passage of particles relative to said scanning aperture,
    said apparatus further comprising:
    oscilloscope means secured to said cabinet and coupled to said analyzing device for transducing said electric signals and displaying the envelope of said signals onto said facing panel adjacent to said image screen, whereby the physical movement of the particles and the electric signals caused thereby, both relative to said aperture, can be visually monitored simultaneously from positions distant from said facing panel.

3. The apparatus defined in claim 2 in which:

said projecting means defines an optical path between said aperture and said image screen which is significantly larger than the straight line distance therebetween.

4. The apparatus defined in claim 3 in which:

said analyzing device and said projecting means are mounted and secured with respect to said cabinet and one another in a substantially fixed relationship.

5. In a particle analyzing apparatus for studying particles suspended in a fluid and for monitoring the passage of the particles relative to a scanning aperture therein, said apparatus incorporating an analyzing device having a microscopic scanning aperture and means for causing the fluid to pass through the scanning aperture, the improvement which consists of means for observing the scanning aperture, comprising:

a cabinet into which said device is mounted, said cabinet having a facing panel, an image screen mounted on said facing panel means secured within said cabinet for projecting an enlarged image of said scanning aperture onto said image screen, whereby the movement of particles to and through said aperture can be visually monitored from positions distant from said facing panel.

6. The apparatus defined in claim 5 in which said analyzing device further includes means for generating electric signals in response to the passage of particles relative to said scanning aperture and said observing means further comprises:

oscilloscope means secured to said cabinet and coupled to said analyzing device for transducing said electric signals and displaying the envelope of said signals onto said facing panel adjacent to said image screen, whereby the physical movement of the particles and the electric signals caused thereby, both relative to said aperture, can be visually monitored simultaneously from positions distant from said facing panel.

7. The apparatus defined in claim 6 in which:

said projecting means defines an optical path between said aperture and said image screen which is significantly longer than the straight line distance therebetween.

8. The apparatus defined in claim 7 in which said projecting means and said oscilloscope means are secured within said cabinet and with respect to one another in a substantially fixed spatial relationship.

References Cited

UNITED STATES PATENTS

| 2,780,956 | 2/1957 | Fuller et al. | 88—14 XR |
| 2,920,525 | 1/1960 | Appel et al. | 88—14 |
| 2,958,255 | 11/1960 | Dietrich | 88—24 XR |
| 2,985,830 | 5/1961 | Coulter et al. | 324—71 |

OTHER REFERENCES

Coulter, "High Speed Blood Cell Counter and Cell Size Analyzer," Coulter Electronics, 11 pages.

RUDOLPH V. ROLINEC, *Primary Examiner.*

E. E. KUBASIEWICZ, *Assistant Examiner.*

UNITED STATES PATENT OFFICE
CERTIFICATE OF CORRECTION

Patent No. 3,389,334                                June 18, 1968

Wallace H. Coulter et al.

It is certified that error appears in the above identified patent and that said Letters Patent are hereby corrected as shown below:

Column 1, line 56, "partcle" should read -- particle --. Column 3, line 17, "tthe" should read -- the --; lines 37 and 38, cancel "breaker 50, an aperture tube 52, a manometer 58, electrodes 66 and 68,". Column 4, lines 55 and 56, the initial word on each cited line should be directly beneath "A" in line 54, same column 4. Column 5, lines 17 to 21, the initial word on each cited line should be aligned directly beneath "In" in line 16; line 26, "means" should be the beginning of line 27 and should be aligned directly under "an" in line 26; same column 5, lines 34 and 35, and Column 6, lines 1 and 2, the initial word of each cited line should be aligned directly under "The" in line 33, same column 5.

Signed and sealed this 16th day of December 1969.

(SEAL)
Attest:

EDWARD M. FLETCHER, JR.                     WILLIAM E. SCHUYLER, JR.
Attesting Officer                              Commissioner of Patents